United States Patent
Wu

(10) Patent No.: US 9,204,027 B2
(45) Date of Patent: Dec. 1, 2015

(54) METHOD FOR PHOTOGRAPHING PROCESSING AND TERMINAL DEVICE

(71) Applicant: Huawei Device Co., Ltd., Shenzhen (CN)

(72) Inventor: Bo Wu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 77 days.

(21) Appl. No.: 14/140,289

(22) Filed: Dec. 24, 2013

(65) Prior Publication Data

US 2014/0104444 A1   Apr. 17, 2014

Related U.S. Application Data

(63) Continuation of application No. PCT/CN2012/081582, filed on Sep. 19, 2012.

(51) Int. Cl.

| | |
|---|---|
| *H04N 5/232* | (2006.01) |
| *G06F 21/53* | (2013.01) |
| *G06F 21/55* | (2013.01) |
| *G06F 21/62* | (2013.01) |
| *H04N 21/2187* | (2011.01) |
| *H04N 21/4223* | (2011.01) |

(52) U.S. Cl.
CPC ............... *H04N 5/232* (2013.01); *G06F 21/53* (2013.01); *G06F 21/554* (2013.01); *G06F 21/629* (2013.01); *H04N 5/23245* (2013.01); *H04N 21/2187* (2013.01); *H04N 21/4223* (2013.01)

(58) Field of Classification Search
CPC .... H04N 5/232; H04N 5/225; H04N 5/23245
See application file for complete search history.

(56) References Cited

U.S. PATENT DOCUMENTS

| | | | |
|---|---|---|---|
| 2002/0106202 A1* | 8/2002 | Hunter | 396/56 |
| 2003/0151669 A1* | 8/2003 | Robins et al. | 348/207.99 |
| 2004/0092284 A1* | 5/2004 | Satoh et al. | 455/550.1 |
| 2004/0166829 A1* | 8/2004 | Nakae et al. | 455/403 |
| 2005/0030387 A1* | 2/2005 | Pilu | 348/211.99 |
| 2005/0068423 A1* | 3/2005 | Bear et al. | 348/207.99 |
| 2005/0181780 A1* | 8/2005 | Park | 455/422.1 |

(Continued)

FOREIGN PATENT DOCUMENTS

| | | |
|---|---|---|
| CN | 1518828 A | 8/2004 |
| CN | 001612631 A | 5/2005 |

(Continued)

*Primary Examiner* — Nicholas Giles
*Assistant Examiner* — Abdelaaziz Tissire
(74) *Attorney, Agent, or Firm* — Slater & Matsil, L.L.P.

(57) ABSTRACT

Embodiments of the present invention provide a photographing processing method and a terminal device. The method includes acquiring a photographing instruction, wherein the photographing instruction includes a photographing parameter required for this photographing operation, and determining, according to the photographing parameter, whether this photographing operation meets a preset photographing condition. If it is determined that this photographing operation does not meet the photographing condition, anti-candid photographing processing is performed on this photographing operation. In technical solutions of the present invention, before photographing is performed, it is determined whether this photographing operation meets a preset photographing condition and if the preset photographing condition is not met, anti-candid photographing processing is performed.

23 Claims, 2 Drawing Sheets

(56) References Cited

U.S. PATENT DOCUMENTS

| | | | |
|---|---|---|---|
| 2006/0028558 A1* | 2/2006 | Sato et al. | 348/211.99 |
| 2006/0135140 A1* | 6/2006 | Rothman et al. | 455/418 |
| 2007/0229669 A1* | 10/2007 | Yamamoto | 348/207.99 |
| 2008/0020732 A1* | 1/2008 | Wu | 455/411 |
| 2009/0033756 A1* | 2/2009 | Kamatani et al. | 348/222.1 |
| 2011/0001838 A1* | 1/2011 | Lee | 348/220.1 |
| 2011/0115924 A1* | 5/2011 | Yu et al. | 348/207.11 |

FOREIGN PATENT DOCUMENTS

| | | |
|---|---|---|
| CN | 001630341 A | 6/2005 |
| EP | 1385318 A1 | 1/2004 |
| JP | 10234080 | 9/1998 |
| JP | 2001313006 | 11/2001 |
| JP | 2004180236 A | 6/2004 |
| JP | 2004343434 A | 12/2004 |
| JP | 2004363942 A | 12/2004 |
| JP | 2004364030 A | 12/2004 |
| JP | 2005286930 A | 10/2005 |
| JP | 2007286921 A | 11/2007 |
| JP | 2008131550 A | 6/2008 |
| JP | 2008311775 A | 12/2008 |
| JP | 2010028859 A | 2/2010 |

* cited by examiner

METHOD FOR PHOTOGRAPHING PROCESSING AND TERMINAL DEVICE

CROSS-REFERENCE TO RELATED APPLICATIONS

This application is a continuation of International Application No. PCT/CN2012/081582, filed on Sep. 19, 2012, which is hereby incorporated by reference in its entirety.

TECHNICAL FIELD

The present invention relates to communications technologies, and in particular, to a photographing processing method and a terminal device.

BACKGROUND

With the popularity of smart terminals having a photographing function, such as mobile phones and tablet computers, malicious programs for candid photographing begin to widely spread. A malicious program for candid photographing usually enables a photographing function of a smart terminal in the background (that is, a photographing interface is not presented to a user or another manner difficult to be noticed by a user is used), so as to photograph and upload a current scene to a network, thereby resulting in disclosure of user privacy. Therefore, it is urgent to solve a problem that a malicious program candidly performs photographing through a terminal.

SUMMARY

Embodiments of the present invention provide a photographing processing method and a terminal device, so as to prevent a malicious program from candidly performing photographing by using a terminal device.

In a first aspect, an embodiment provides a photographing processing method. The method includes acquiring a photographing instruction, where the photographing instruction includes a photographing parameter required for this photographing operation, and determining, according to the photographing parameter, whether this photographing operation meets a preset photographing condition. If it is determined that this photographing operation does not meet the photographing condition, performing anti-candid photographing processing on this photographing operation.

In a first possible implementation manner of the first aspect, the photographing condition includes enabling a preview function. The determining, according to the photographing parameter, whether this photographing operation meets a preset photographing condition includes determining whether the photographing parameter includes a first parameter instructing the enabling of the preview function. If it is determined that the photographing parameter does not include the first parameter, determining that this photographing operation does not meet the photographing condition.

With reference to the first possible implementation manner of the first aspect, in a second possible implementation manner of the first aspect, the photographing condition further includes a threshold of a size of a preview window. The determining, according to the photographing parameter, whether this photographing operation meets a preset photographing condition further includes, if it is determined that the photographing parameter includes the first parameter, determining whether a second parameter which is in the photographing parameter and indicates the size of the preview window is greater than or equal to the threshold of the size of the preview window. If it is determined that the second parameter is smaller than the threshold of the size of the preview window, determining that this photographing operation does not meet the photographing condition.

With reference to the first aspect, or the first possible implementation manner of the first aspect, or the second possible implementation manner of the first aspect, in a third possible implementation manner of the first aspect, the performing anti-candid photographing processing on this photographing operation includes directly terminating this photographing operation or replacing image data obtained in this photographing operation with preset image data.

With reference to the third possible implementation manner of the first aspect, in a fourth possible implementation manner of the first aspect, the directly terminating this photographing operation includes refusing to send the photographing instruction to a photographing module, so as to terminate this photographing operation.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner of the first aspect, the acquiring a photographing instruction includes receiving the photographing instruction sent by a first application by invoking an application programming interface of a photographing program.

In a second aspect, a terminal device is provided and includes an acquiring module, a determining module, and an anti-candid photographing processing module. The acquiring module is configured to acquire a photographing instruction, wherein the photographing instruction includes a photographing parameter required for this photographing operation. The determining module is configured to determine, according to the photographing parameter, whether this photographing operation meets a preset photographing condition. The anti-candid photographing processing module is configured to perform anti-candid photographing processing on this photographing operation when the determining module determines that this photographing operation does not meet the photographing condition.

In a first possible implementation manner of the second aspect, the photographing condition includes an enabling a preview function, and the determining module is configured to determine whether the photographing parameter includes a first parameter instructing the enabling of the preview function. If it is determined that the photographing parameter does not include the first parameter, the determining module determines that this photographing operation does not meet the photographing condition.

With reference to the first possible implementation manner of the second aspect, in a second possible implementation manner of the second aspect, the photographing condition further includes a threshold of a size of a preview window, and the determining module is further configured to, if it is determined that the photographing parameter includes the first parameter, determine whether a second parameter, which is in the photographing parameter, indicates the size of the preview window is greater than or equal to the threshold of the size of the preview window. If it is determined that the second parameter is smaller than the threshold of the size of the preview window, the determining module determines that this photographing operation does not meet the photographing condition.

With reference to the second aspect, or the first possible implementation manner of the second aspect, or the second possible implementation manner of the second aspect, in a third possible implementation manner of the second aspect, the anti-candid photographing processing module is configured to directly terminate this photographing operation, or replace image data obtained in this photographing operation with preset image data.

With reference to the third possible implementation manner of the second aspect, in a fourth possible implementation manner of the second aspect, that the anti-candid photographing processing module is configured to directly terminate this photographing operation includes that the anti-candid photographing processing module is configured to refuse to send the photographing instruction to a photographing module, so as to terminate this photographing operation.

With reference to the second aspect, or the first possible implementation manner of the second aspect, or the second possible implementation manner of the second aspect, or the third possible implementation manner of the second aspect, or the fourth possible implementation manner of the second aspect, in a fifth possible implementation manner of the second aspect, the acquiring module is configured to receive the photographing instruction sent by a first application by invoking an application programming interface of a photographing program.

In a third aspect, a terminal device is provided and includes at least one processor and a memory, wherein the memory is configured to store an executable program code. The processor runs a program corresponding to the executable program code by reading the executable program code stored in the memory, so as to be configured to acquire a photographing instruction, wherein the photographing instruction includes a photographing parameter required for this photographing operation and determine, according to the photographing parameter, whether this photographing operation meets a preset photographing condition. The processor is further configured to perform anti-candid photographing processing on this photographing operation if it is determined that this photographing operation does not meet the photographing condition.

In the photographing processing method and the terminal device provided in the embodiments of the present invention, before photographing is performed, it is determined whether this photographing operation meets a preset photographing condition. If the condition is not met, anti-candid photographing processing is performed, thereby solving a problem that a malicious program candidly performs photographing by using a terminal.

BRIEF DESCRIPTION OF DRAWINGS

To illustrate the technical solutions in the embodiments of the present invention more clearly, accompanying drawings that describe the embodiments are introduced briefly in the following. The accompanying drawings in the following description are only some embodiments of the present invention, and persons of ordinary skill in the art may further obtain other drawings according to these accompanying drawings without creative efforts.

DESCRIPTION OF EMBODIMENTS

In order to make the objectives, technical solutions, and advantages of the embodiments of the present invention more comprehensible, the technical solutions in the embodiments of the present invention are clearly described in the following with reference to the accompanying drawings. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
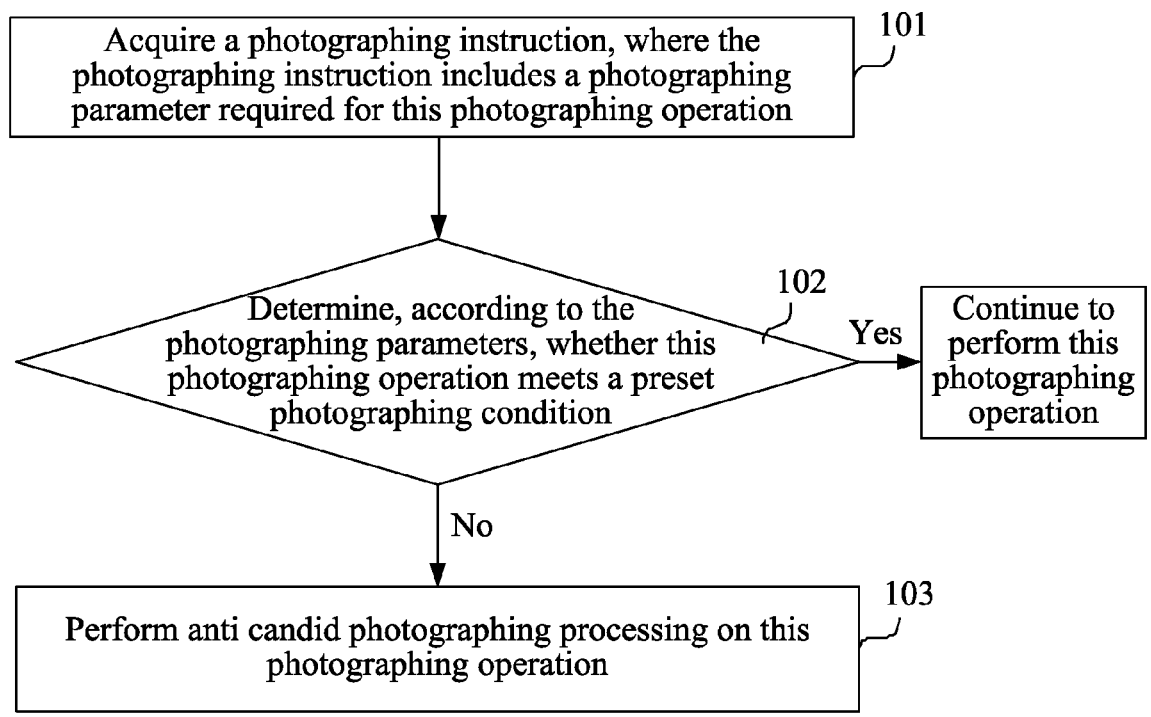
FIG. 1 is a flow chart of a photographing processing method according to an embodiment of the present invention.

FIG. 1 is a flow chart of a photographing processing method according to an embodiment of the present invention. As shown in FIG. 1, the method in this embodiment includes the following steps.

Step 101: Acquire a photographing instruction, where the photographing instruction includes a photographing parameter required for this photographing operation.

Step 102: Determine, according to the photographing parameter, whether this photographing operation meets a preset photographing condition. If a determining result is no, that is, this photographing operation does not meet the preset photographing condition, perform step 103, and if the determining result is yes, that is, this photographing operation meets the preset photographing condition, continue to perform this photographing operation, for example, perform photographing by sending a photographing instruction.

Step 103: Perform anti-candid photographing processing on this photographing operation.

An execution body of this embodiment may be a terminal device, and further specifically, may be a photographing processing module in the terminal device. The photographing processing module of the terminal device may include a software control part (called a photographing program) and a hardware part (called a photographing module or a camera).

In an embodiment, after acquiring a photographing instruction, the photographing processing module acquires a photographing parameter required for this photographing operation from the photographing instruction. Optionally, the photographing instruction may be sent by a user to the photographing processing module through a photographing operation function provided by the terminal device; the photographing operation function provided by the terminal device may be a photographing option on a menu, may be an icon displayed on a desktop, may be a shortcut, and may also be a key on the terminal device. Optionally, the photographing instruction may also be sent by a certain application on the terminal device, and the application is called a first application to be differentiated from the photographing program. Specifically, the first application may send a photographing instruction by invoking an application programming interface (Application Programming Interface, API for short) of the photographing program, and a parameter input during invocation of the API is the foregoing photographing parameter. Correspondingly, the photographing processing module may receive the photographing instruction sent by the first application by invoking the API of the photographing program.

In this embodiment, in order to present a malicious program from candidly performing photographing by using the terminal device, a photographing condition that should be met during normal photographing is pre-stored on the terminal device, that is, the foregoing preset photographing condition. If a photographing operation does not meet the preset photographing condition, the photographing operation is considered as candid photographing. On this basis, after acquiring the foregoing photographing parameter, the photographing processing module determines, according to the foregoing photographing parameter, whether this photographing operation meets the preset photographing condition. If it is determined that this photographing operation meets the preset photographing condition, this photographing operation is considered as normal photographing, and this photographing operation continues to be performed, for example, photographing is performed by sending a photographing instruction to the photographing module. If it is determined that this photographing operation does not meet the preset photographing condition, this photographing operation is considered as candid photographing; and therefore, anti-candid photographing processing is performed on this photographing operation, so as to solve a problem that the malicious program candidly performs photographing through the terminal device, thereby avoiding disclosure of user privacy.

The foregoing preset photographing condition may include any condition that can indicate that a photographing action is normal photographing, for example, a hardware condition and an external condition required for photographing and a required parameter.

Currently, for normal photographing, a preview function is usually enabled; however, for a candid photographing action, the preview function is usually not enabled. On this basis, in an optional implementation manner of this embodiment, the preset photographing condition includes: enabling the preview function. For this, if photographing is normal photographing, the photographing parameter should include a first parameter instructing the enabling of the preview function. An implementation manner of step 102 includes: determining, by the photographing processing module, whether the photographing parameter acquired from the photographing instruction includes the first parameter instructing the enabling of the preview function. If it is determined that the foregoing photographing parameter does not include the first parameter, which indicates that this photographing operation does not enable the preview function, determining that this photographing operation does not meet the preset photographing condition, which indicates that this photographing operation is candid photographing. Optionally, if a condition required for normal photographing merely includes enabling the preview function, but does not limit a size of a preview window, after the photographing processing module determines that the foregoing photographing parameter includes the first parameter, it may be determined that this photographing operation is normal photographing.

Furthermore, for normal photographing, if it is required to enable the preview function, it is usually further required that the preview window meets a certain size. On this basis, in another optional implementation manner of this embodiment, the preset photographing condition further includes a threshold of the size of the preview window in addition to enabling the preview function. The size of the preview window is usually indicated by the number of pixels multiplied by the number of pixels, for example, the size of the preview window is 10×10. A specific value of the threshold of the size of the preview window is not limited in this embodiment, and adaptive setting may be performed according to different terminal devices and different application requirements. In this implementation manner, if photographing is normal photographing, the photographing parameter further includes a second parameter indicating the size of the preview window in addition to the first parameter instructing the enabling of the preview function.

Another implementation manner of step 102 includes determining, by the photographing processing module, whether the photographing parameter acquired from the photographing instruction includes the first parameter instructing the enabling of the preview function. If it is determined that the foregoing photographing parameter does not include the first parameter, which indicates that this photographing operation does not enable the preview function, determining that this photographing operation does not meet the preset photographing condition, which indicates that this photographing operation is candid photographing. If it is determined that the foregoing photographing parameter includes the first parameter, which indicates that this photographing operation enables the preview function, continuing to determine whether the second parameter which is in the photographing parameter and indicates the size of the preview window is greater than or equal to a threshold of the size of the preview window. If it determined that the second parameter is smaller than the threshold of the size of the preview window, which indicates that the preview function is enabled but the preview window is excessively small, determining that this photographing operation does not meet the preset photographing condition and is candid photographing. If it is determined that the second parameter is greater than or equal to the threshold of the size of the preview window, determining that this photographing operation meets the preset photographing condition and is normal photographing.

Based on the photographing condition provided in the foregoing implementation manners, the determining whether this photographing operation is candid photographing has an advantage of being simple and easy to be implemented.

Based on the foregoing implementation manners, an optional implementation manner of this embodiment provides an implementation manner of performing anti-candid photographing processing in step 103. The implementation manner is when it is determined that this photographing operation does not meet the preset photographing condition, directly terminating this photographing operation. A specific implementation manner of directly terminating this photographing operation is refusing to send the photographing instruction to the photographing module, so as to terminate this photographing operation. The photographing module only performs photographing after receiving a photographing instruction. This implementation manner not only achieves an objective of avoiding candid photographing, but also is easy to be implemented and has high efficiency.

Based on the foregoing implementation manners, another optional implementation manner of this embodiment provides an implementation manner of performing anti-candid photographing processing in step 103. This implementation manner is replacing image data obtained in this photographing operation with preset image data. In the implementation manner, if it is determined that this photographing operation does not meet the preset photographing condition, the photographing operation continues to be performed. After the photographing is performed successfully, image data obtained through the photographing is stored in a memory space. To prevent the image data from being uploaded to a network to result in disclosure of user privacy, the photographing processing module may replace the image data obtained in this photographing operation with the preset image data. In this way, an objective of avoiding the disclosure of the user privacy may also be achieved and prevention of a candid photographing action is implemented.

As seen from the foregoing description, in the anti-candid photographing method provided in this embodiment, before performing photographing, the photographing processing module of the terminal device determines whether this photographing operation meets a preset photographing condition. If the condition is not met, it indicates that this photographing is candid photographing, and anti-candid photographing processing is performed, thereby solving a problem that a malicious program candidly performs photographing by using a terminal, and avoiding disclosure of user privacy.

Figure 2:
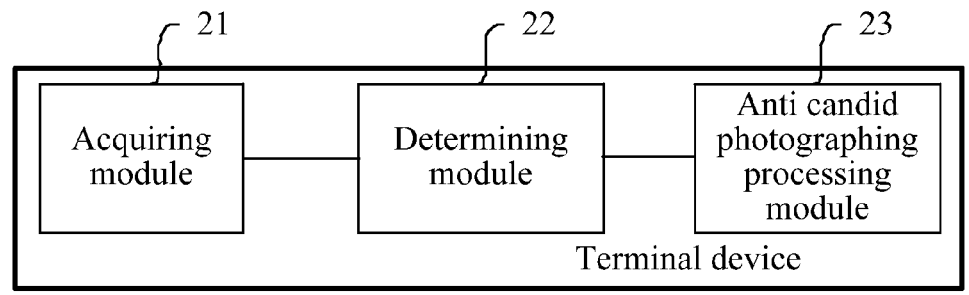
FIG. 2 is a schematic structural diagram of a terminal device according to an embodiment of the present invention.

FIG. 2 is a schematic structural diagram of a terminal device according to an embodiment of the present invention. The terminal device in this embodiment may be a variety of devices having a photographing function, such as a smart phone and a tablet computer. As shown in FIG. 2, the terminal device in this embodiment includes an acquiring module 21, a determining module 22, and an anti-candid photographing processing module 23.

The acquiring module 21 is configured to acquire a photographing instruction, where the photographing instruction includes a photographing parameter required for this photographing operation. The determining module 22 is connected to the acquiring module 21 and is configured to determine, according to the photographing parameter obtained by the acquiring module 21, whether this photographing operation meets a preset photographing condition. The anti-candid photographing processing module 23 is connected to the determining module 22 and is configured to perform anti-candid photographing processing on this photographing operation when the determining module 22 determines that this photographing operation does not meet the foregoing preset photographing condition.

In an optional implementation manner, the foregoing preset photographing condition includes enabling a preview function. On this basis, the determining module 22 is configured to determine whether the foregoing photographing parameter includes a first parameter instructing the enabling of the preview function, wherein if it is determined that the foregoing photographing parameter does not include the first parameter, it indicates that this photographing operation does not enable the preview function, and it is determined that this photographing operation does not meet the foregoing photographing condition.

In another optional implementation manner, the foregoing preset photographing condition further includes a threshold of a size of a preview window in addition to enabling the preview function. On this basis, the determining module 22 is configured to determine whether the foregoing photographing parameter includes the first parameter instructing the enabling of the preview function, and when it is determined that the foregoing photographing parameter does not include the first parameter, determine that this photographing operation does not meet the foregoing photographing condition. In addition, the determining module 22 is further configured to, when it is determined that the foregoing photographing parameter includes the first parameter, further determine whether a second parameter which is in the foregoing photographing parameter and indicates the size of the preview window is greater than or equal to the foregoing threshold of the size of the preview window. If it is determined that the second parameter is smaller than the threshold of the size of the preview window, determine that this photographing operation does not meet the foregoing photographing condition.

In an optional implementation manner, that the anti-candid photographing processing module 23 performs anti-candid photographing processing on this photographing operation includes that the anti-candid photographing processing module 23 is configured to directly terminate this photographing operation or the anti-candid photographing processing module 23 is configured to replace image data obtained in this photographing operation with preset image data.

Furthermore, that the anti-candid photographing processing module 23 is configured to directly terminate this photographing operation includes that the anti-candid photographing processing module 23 is configured to refuse to send the photographing instruction to a photographing module, so as to terminate this photographing operation.

In an optional implementation manner, the acquiring module 21 may be configured to receive the photographing instruction sent by a first application by invoking an application programming interface of a photographing program.

The functional modules of the terminal device in this embodiment may be configured to execute a process of the foregoing photographing processing method; specific working principles are not repeatedly described herein, and for details, reference may be made to the description in the method embodiment.

Before performing photographing, the terminal device in this embodiment determines whether this photographing operation meets a preset photographing condition. If the condition is not met, it indicates that this photographing is candid photographing, and anti-candid photographing processing is performed, thereby solving a problem that a malicious program candidly performs photographing by using a terminal, and avoiding disclosure of user privacy.

Figure 3:
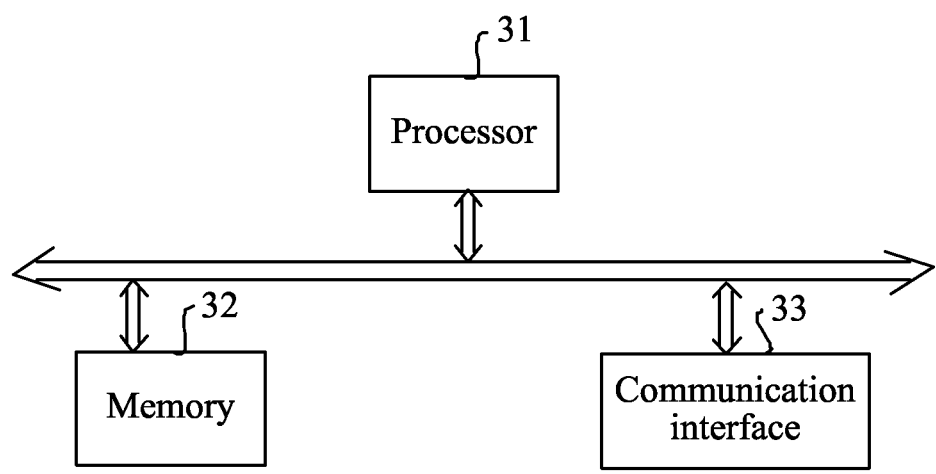
FIG. 3 is a schematic structural diagram of a terminal device according to another embodiment of the present invention.

FIG. 3 is a schematic structural diagram of a terminal device according to another embodiment of the present invention. As shown in FIG. 3, the terminal device in this embodiment includes at least one processor 31 and a memory 32. The processor 31 and the memory 32 are connected through a bus. The bus may be an industry standard architecture (Industry Standard Architecture, ISA for short) bus, a peripheral component interconnect (Peripheral Component Interconnect, PCI for short) bus, or an extended industry standard architecture (Extended Industry Standard Architecture, EISA for short) bus, or the like. The bus may be classified into an address bus, a data bus, a control bus, and so on. For ease of description, merely one thick line is used in FIG. 3, but it does not indicate that there is only one bus or only one type of bus.

The memory 32 is configured to store an executable program code, where the program code includes a computer operation instruction. The memory 32 may include a high-speed RAM memory, or may further include a non-volatile memory (non-volatile memory), for example, at least one magnetic disk memory. The processor 31 runs a program corresponding to the executable program code by reading the executable program code stored in the memory 32, so as to be configured to acquire a photographing instruction, where the photographing instruction includes a photographing parameter required for this photographing operation, and to determine, according to the foregoing photographing parameter, whether this photographing operation meets a preset photographing condition. It is further configured to perform anti-candid photographing processing on this photographing operation if it is determined that this photographing operation does not meet the foregoing preset photographing condition.

The processor 31 may be a central processing unit (Central Processing Unit, CPU for short), or an application specific integrated circuit (Application Specific Integrated Circuit, ASIC for short), or is configured to be one or more integrated circuits for implementing the embodiment of the present invention.

Furthermore, as shown in FIG. 3, the terminal device in this embodiment further includes a communication interface 33. The communication interface 33 is also connected to the processor 31 and the memory 32 through a bus, and is mainly configured to implement communication between the terminal device in this embodiment and another device. In addition, the terminal device in this embodiment further includes a power supply module, configured to supply power to other modules of the terminal device. The power supply module is not shown in FIG. 3.

The terminal device in this embodiment may be configured to execute a process of the foregoing photographing processing method; specific working principles are not repeatedly described herein, and for details, reference may be made to the description in the method embodiment.

Before performing photographing, the terminal device in this embodiment determines whether this photographing operation meets a preset photographing condition, and if the condition is not met, it indicates that this photographing is candid photographing, and anti-candid photographing processing is performed, thereby solving a problem that a malicious program candidly performs photographing by using a terminal, and avoiding disclosure of user privacy.

Those of ordinary skill in the art should understand that all or a part of the steps of the foregoing method embodiments may be implemented by a program instructing relevant hardware. The program may be stored in a computer readable storage medium. When the program is run, the steps of the foregoing method embodiments are performed. The storage medium may include various media capable of storing program codes, such as a ROM, a RAM, a magnetic disk or an optical disk.

Finally, it should be noted that the foregoing embodiments are merely provided for describing the technical solutions of the present invention, but not intended to limit the present invention. Although the present invention is described in detail with reference to the foregoing embodiments, persons of ordinary skill in the art should understand that they may still make modifications to the technical solutions described in the foregoing embodiments, or equivalent replacements to a part or all of the technical features in the technical solutions described in the foregoing embodiments; however, these modifications or replacements do not make the essence of the corresponding technical solutions depart from the scope of the technical solutions of the embodiments of the present invention.

What is claimed is:

1. A photographing processing method, comprising:
acquiring, by a terminal, a photographing instruction, wherein the photographing instruction includes a photographing parameter for a photographing operation;
determining, by the terminal, according to the photographing parameter, whether the photographing operation meets a preset photographing condition; and
upon determining the photographing operation does not meet the preset photographing condition, performing, by the terminal, anti-candid photographing processing on the photographing operation;
wherein the preset photographing condition comprises enabling a preview function, and wherein the determining, according to the photographing parameter, whether the photographing operation meets the preset photographing condition comprises:
determining, by the terminal, whether the photographing parameter comprises a first parameter instructing the enabling of the preview function; and
upon determining the photographing parameter does not comprise the first parameter, determining, by the terminal, that the photographing operation does not meet the preset photographing condition.

2. The photographing processing method according to claim 1, wherein the performing anti-candid photographing processing on the photographing operation comprises terminating the photographing operation.

3. The photographing processing method according to claim 1, wherein the performing anti-candid photographing processing on the photographing operation comprises replacing image data obtained in the photographing operation with preset image data.

4. The photographing processing method according to claim 1, wherein the acquiring a photographing instruction comprises receiving the photographing instruction from a first application by invoking an application programming interface of a photographing program.

5. The photographing processing method according to claim 1, wherein the preset photographing condition further comprises a threshold size of a preview window, and wherein the determining, according to the photographing parameter, whether the photographing operation meets the preset photographing condition further comprises:
upon determining that the photographing parameter comprises the first parameter, determining, by the terminal, whether the photographing parameter comprises a second parameter that indicates a size of the preview window is greater than or equal to the threshold size of the preview window; and
upon determining that the second parameter indicates a size smaller than the threshold size of the preview window, determining, by the terminal, that the photographing operation does not meet the photographing condition.

6. The photographing processing method according to claim 5, wherein the acquiring a photographing instruction comprises receiving the photographing instruction from a first application by invoking an application programming interface of a photographing program.

7. The photographing processing method according to claim 1, wherein the performing anti-candid photographing processing on the photographing operation comprises terminating the photographing operation.

8. The photographing processing method according to claim 7, wherein the terminating the photographing operation comprises terminating the photographing operation without sending the photographing instruction to a photographing module.

9. The photographing processing method according to claim 1, wherein the performing anti-candid photographing processing on the photographing operation comprises replacing image data obtained in the photographing operation with preset image data.

10. The photographing processing method according to claim 1, wherein the acquiring a photographing instruction comprises receiving the photographing instruction from a first application by invoking an application programming interface of a photographing program.

11. A terminal device, comprising:
an acquiring module configured to acquire a photographing instruction, wherein the photographing instruction comprises a photographing parameter required for a photographing operation;

a determining module configured to determine, according to the photographing parameter, whether the photographing operation meets a preset photographing condition; and an anti-candid photographing processing module configured to perform anti-candid photographing processing on the photographing operation when the determining module determines that the photographing operation does not meet the preset photographing condition; wherein the photographing condition comprises enabling a preview function, and wherein the determining module is configured to determine whether the photographing parameter comprises a first parameter instructing the enabling of the preview function and, upon determining that the photographing parameter does not comprise the first parameter, determine that the photographing operation does not meet the photographing condition.

12. The terminal device according to claim 11, wherein the photographing condition further comprises a threshold size of a preview window and wherein the determining module is further configured to:

upon determining that the photographing parameter comprises the first parameter, determining whether a second parameter in the photographing parameter indicates a size of the preview window greater than or equal to the threshold size of the preview window; and upon determining that the second parameter is smaller than the threshold size of the preview window, determine that the photographing operation does not meet the photographing condition.

13. The terminal device according to claim 12, wherein the anti-candid photographing processing module is configured to terminate the photographing operation or replace image data obtained in the photographing operation with preset image data.

14. The terminal device according to claim 12, wherein the acquiring module is configured to receive the photographing instruction from a first application by invoking an application programming interface of a photographing program.

15. The terminal device according to claim 11, wherein the anti-candid photographing processing module is configured to terminate the photographing operation or replace image data obtained in the photographing operation with preset image data.

16. The terminal device according to claim 11, wherein that the anti-candid photographing processing module is configured to terminate the photographing operation without sending the photographing instruction to a photographing module.

17. The terminal device according to claim 11, wherein the acquiring module is configured to receive the photographing instruction from a first application by invoking an application programming interface of a photographing program.

18. A terminal device, comprising at least one processor and a memory, wherein the memory is configured to store an executable program code, the processor runs a program corresponding to the executable program code by reading the executable program code stored in the memory, so as to be configured to:

acquire a photographing instruction, wherein the photographing instruction comprises a photographing parameter required for a photographing operation;

determine, according to the photographing parameter, whether the photographing operation meets a preset photographing condition; and upon determining the photographing operation does not meet the photographing condition, perform anti-candid photographing processing on the photographing operation;

wherein the preset photographing condition comprises enabling a preview function, and wherein the determining, according to the photographing parameter, whether the photographing operation meets the preset photographing condition comprises:

determining, by the terminal, whether the photographing parameter comprises a first parameter instructing the enabling of the preview function; and upon determining the photographing parameter does not comprise the first parameter, determining, by the terminal, that the photographing operation does not meet the preset photographing condition.

19. A terminal device, comprising:

an camera and a processor, wherein the camera is configured to acquire a photographing instruction, wherein the photographing instruction comprises a photographing parameter required for a photographing operation, wherein the processor is configured to determine, according to the photographing parameter, whether the photographing operation meets a preset photographing condition, wherein the camera is further configured to perform anti-candid photographing processing on the photographing operation when the processor determines that the photographing operation does not meet the preset photographing condition, wherein the photographing condition comprises enabling a preview function, and wherein the processor is further configured to determine whether the photographing parameter comprises a first parameter instructing the enabling of the preview function and, upon determining that the photographing parameter does not comprise the first parameter, determine that the photographing operation does not meet the photographing condition.

20. The terminal device according to claim 19, wherein the photographing condition further comprises a threshold size of a preview window and wherein the processor is further configured to:

upon determining that the photographing parameter comprises the first parameter, determining whether a second parameter in the photographing parameter indicates a size of the preview window greater than or equal to the threshold size of the preview window; and upon determining that the second parameter is smaller than the threshold size of the preview window, determine that the photographing operation does not meet the photographing condition.

21. The terminal device according to claim 20, wherein the camera is configured to terminate the photographing operation or replace image data obtained in the photographing operation with preset image data.

22. The terminal device according to claim 19, wherein the camera is configured to receive the photographing instruction from a first application by invoking an application programming interface of a photographing program.

23. The terminal device according to claim 19, wherein the camera is configured to terminate the photographing operation or replace image data obtained in the photographing operation with preset image data.

* * * * *